US009346376B2

(12) United States Patent
Hiemstra

(10) Patent No.: US 9,346,376 B2
(45) Date of Patent: May 24, 2016

(54) RECLINER MECHANISM

(75) Inventor: Bruce A. Hiemstra, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 206 days.

(21) Appl. No.: 13/575,844

(22) PCT Filed: Jan. 28, 2011

(86) PCT No.: PCT/US2011/022838
§ 371 (c)(1),
(2), (4) Date: Aug. 22, 2012

(87) PCT Pub. No.: WO2011/094478
PCT Pub. Date: Aug. 4, 2011

(65) Prior Publication Data
US 2012/0313416 A1 Dec. 13, 2012

(51) Int. Cl.
B60N 2/235 (2006.01)
(52) U.S. Cl.
CPC .................... B60N 2/2356 (2013.01)
(58) Field of Classification Search
USPC ....... 297/364, 365, 366, 367 P, 367 L, 367 R, 297/368, 369, 370, 372
See application file for complete search history.

(56) References Cited

U.S. PATENT DOCUMENTS

| | | | | |
|---|---|---|---|---|
| 5,590,931 A * | 1/1997 | Fourrey et al. | ................ | 297/366 |
| 5,785,386 A | 7/1998 | Yoshida | | |
| 6,092,874 A * | 7/2000 | Kojima et al. | ............ | 297/367 R |
| 6,305,748 B1 | 10/2001 | Ohba | | |
| 6,474,740 B1 * | 11/2002 | Kondo | ................ | B60N 2/2356 297/367 R |
| 6,869,144 B2 | 3/2005 | Shephard | | |
| 7,188,905 B2 * | 3/2007 | Ham | ......................... | 297/367 R |
| 7,404,604 B2 * | 7/2008 | Nag et al. | .................. | 297/367 R |
| 7,552,971 B1 * | 6/2009 | Tarusawa | ............. | B60N 2/2356 297/367 P |
| 8,123,297 B2 * | 2/2012 | Quast et al. | ................... | 297/366 |
| 2002/0033627 A1 * | 3/2002 | Hoshihara | ............ | B60N 2/2356 297/367 R |
| 2002/0043853 A1 | 4/2002 | Shephard | | |
| 2002/0171280 A1 * | 11/2002 | Okazaki | ............... | B60N 2/2356 297/367 R |
| 2011/0309665 A1 * | 12/2011 | Leighton et al. | ............. | 297/366 |
| 2014/0077563 A1 * | 3/2014 | Higashi et al. | ............ | 297/367 R |

FOREIGN PATENT DOCUMENTS

| | | |
|---|---|---|
| JP | 09-131237 A | 5/1997 |
| JP | 11-155671 A | 6/1999 |
| JP | 2000-175759 A | 6/2000 |
| JP | 2008-12034 A | 1/2008 |
| WO | 2008046004 A1 | 4/2008 |
| WO | WO 2008/046004 * | 4/2008 ............ B60N 2/235 |
| WO | 2009091980 A1 | 7/2009 |

* cited by examiner

Primary Examiner — David R Dunn
Assistant Examiner — Timothy J Brindley
(74) Attorney, Agent, or Firm — Dickinson Wright PLLC

(57) ABSTRACT

A recliner mechanism for use in connection with reclining a vehicle seat and a unitary cam and cam spring mount member.

18 Claims, 10 Drawing Sheets

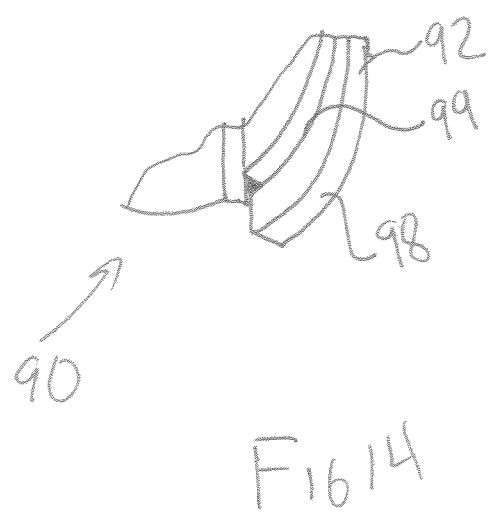

RECLINER MECHANISM

CROSS-REFERENCE TO RELATED APPLICATION

This U.S. National Stage patent application claims priority to International Patent Application Serial No. PCT/US2011/022838 filed on Jan. 28, 2011, entitled "Recliner Mechanism," and U.S. Provisional Patent Application Ser. No. 61/299,402 filed Jan. 29, 2010, entitled "Recliner Mechanism," the entire disclosures of these applications being considered part of the disclosure of this application, and hereby incorporated by reference.

BACKGROUND

The present invention relates generally to vehicle seating and more specifically, to a recliner mechanism for use in connection with reclining a vehicle seat.

Many vehicle seats have a recliner mechanism so that a seat occupant may selectively adjust a seatback relative to the seatbase to provide different positions depending on the desired position of the occupant. The recliner mechanism may be a powered recline mechanism or a manual recliner mechanism. The present invention generally relates to a manual recliner mechanism. Most manual recliner mechanisms are puck-shaped, internally-toothed and use an internal cam mechanism to selectively lock and release the seatback relative to the seatbase.

Recliner mechanisms generally include a seatbase bracket, coupled to the seatbase to securely retain the mechanism. A base plate is typically affixed to the seatbase or seatbase bracket and the top plate is typically affixed to the seatback. Secure welds or other fastening techniques are used to secure the base plate to the seatbase or seatbase bracket and the top plate to the seatback.

The recliner mechanisms typically further include at least one pawl member having teeth that are engaged with teeth on the top plate, when the recliner mechanism and therefore the seatback is locked from rotational movement and disengaged from the top plate when the recliner mechanism and therefore the seatback is capable of rotational movement.

In operation, a typical rotary recliner mechanism is spring biased to a locked condition, i.e., so the seatback is fixed in an angular position until pawls are intentionally disengaged from the top plate. More specifically, when the recliner mechanism is actuated, typically by a handle or lever rotating the driveshaft, the cam member rotates to release the pawl members from engagement and indirectly through use of a guide plate, moves the pawl members inward thereby removing the teeth of the pawl members from the teeth of the top and plate thereby unlocking (or releasing) the recliner mechanism, such that the seatback may be selectively pivoted in the fore or aft direction to adjust the vehicle seat.

Such rotary recliner mechanisms are carefully designed to meet current safety requirements while also limiting the amount of slack or play that can be perceived by a seat occupant. As a result, prior art recliner mechanisms tend to be heavily constructed items in order to withstand certain load conditions and as such, add significantly to the overall vehicle weight. For example, in order to withstand radial stresses caused when the pawl member teeth are engaged with the internal teeth of the top plate, the base plate and the top plate are typically formed with a large material thickness which adds weight.

Further, since the release handle is used often by the occupant, the pivot and cam can be subject to high forces which may ultimately cause play in the interaction between the release handle and the recliner mechanism. Rotary recliner mechanisms are also time consuming to assemble.

There remains a significant and continuing need to provide an improved recliner mechanism that can handle greater loads, weigh less and reduce play between the release handle and the recliner mechanism, and are easy to assemble.

SUMMARY

The present invention relates generally to vehicle seating and more specifically, to a recliner mechanism for use in connection with reclining a vehicle seat. The recliner mechanism includes a base plate and retainer plate cooperating to support each other, thereby allowing the size and weight of the recliner mechanism to be reduced. The recliner mechanism further includes a single member cam-pivot, which further allows reduction in size and weight of the recliner mechanism.

The recliner mechanism may include a cam member having a cam portion integrally formed with a extended portion and wherein the extended portion extends along an axis and has an outer pivot surface including a cam spring mounting area that is not substantially circular and a base plate extension area that is substantially circular and wherein the extended portion includes an inner surface configured to engage a drive shaft and prevent rotation relative to the driveshaft and wherein the cam portion extends outwardly from the extended portion and includes an outer cam surface. The inner surface includes at least one non-circular surface, which may be at least one internal spline.

The recliner mechanism for a vehicle seat assembly may further include a retainer plate having a spring attachment leg, and a substantially circular inner circumference, and a base plate having an outer circumference that is approximately circular in shape and includes an alignment ledge on the circular portions capable of aligning and positioning the retainer plate relative to the base plate, and a substantially circular base plate aperture. A top plate formed from 10B21 material with no masking required may be included.

The recliner mechanism for a vehicle seat assembly including an axis or rotation, the recliner mechanism further is directed to a retainer plate having a substantially circular inner circumference having a first radius from the axis of rotation a base plate having arcuate members including an alignment ledge capable of aligning and positioning the retainer plate relative to the base plate, and wherein the arcuate members define pawl gaps therebetween and wherein the arcuate members have a second radius from the axis or rotation, a unitary cam-pivot member aligned about the axis of rotation and extending through the base plate and the retainer plate along the axis of rotation and wherein the unitary cam-pivot member is integrally formed from a single piece of metal and wherein the unitary cam-pivot member includes a cam portion and a extended portion, the extended portion including a cam spring mounting area and a base plate extension area, and wherein the unitary cam-pivot member is capable of rotating relative to the base plate.

BRIEF DESCRIPTION OF THE DRAWINGS

FIG. 14 is a partial perspective view of the base plate.

DETAILED DESCRIPTION

Referring to the Figures, wherein like numerals indicate like or corresponding parts throughout the several views, an exemplary motor vehicle is shown. The vehicle is shown here in the form of a passenger vehicle, but it will be appreciated that the vehicle type is not relevant to this disclosure. The vehicle includes at least one seat assembly 10 of the type including a seatback 14 hingedly connected to a seatbase 12. The seatbase 12 is anchored to the floor of the passenger compartment using any of the various anchoring techniques, such as fore and aft adjustable slides, releasable hooks, fixed mounts, and the like.

Figure 1:
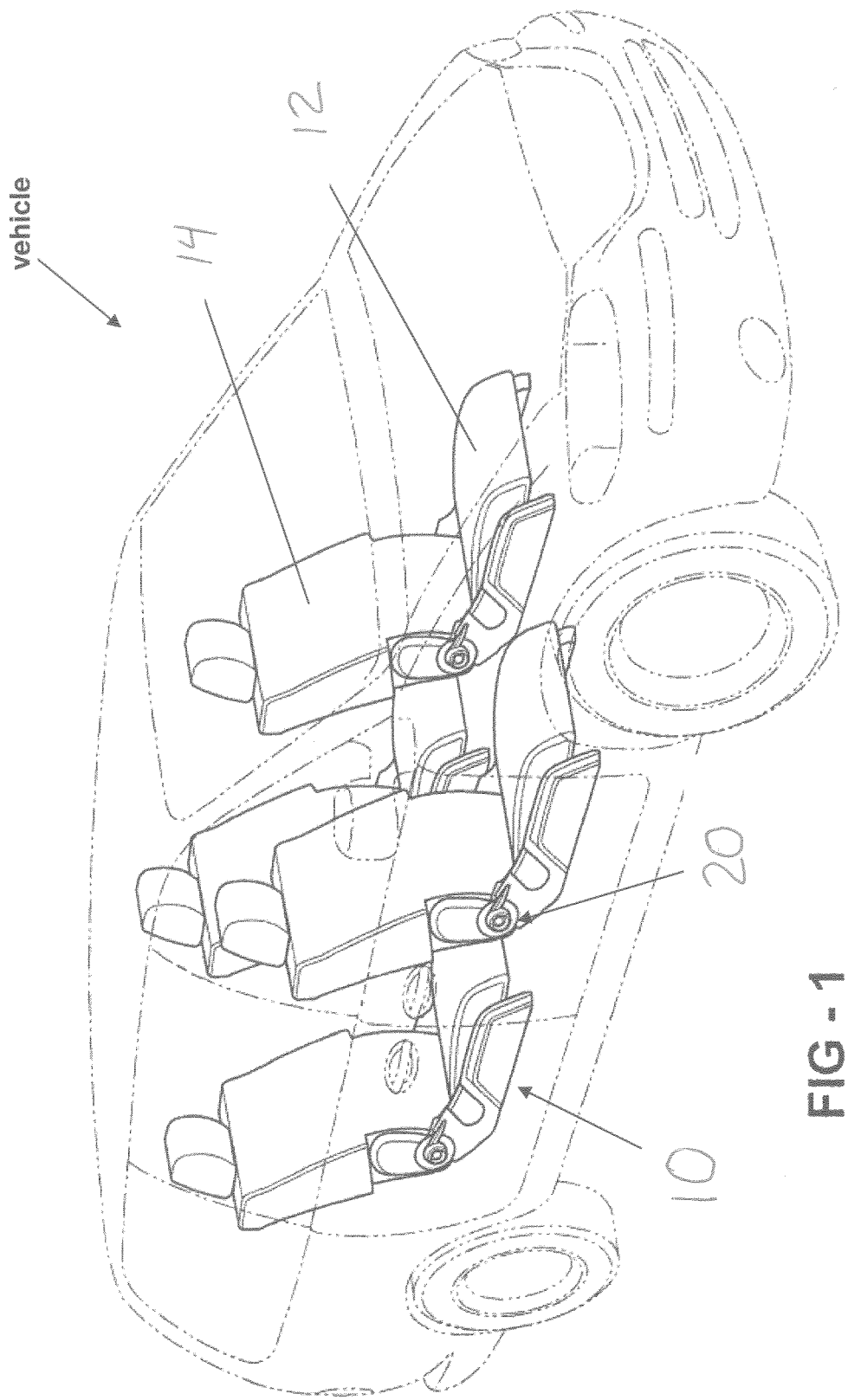
FIG. 1 is a perspective view of a vehicle having a seat assembly according to an exemplary embodiment.
Figure 2:
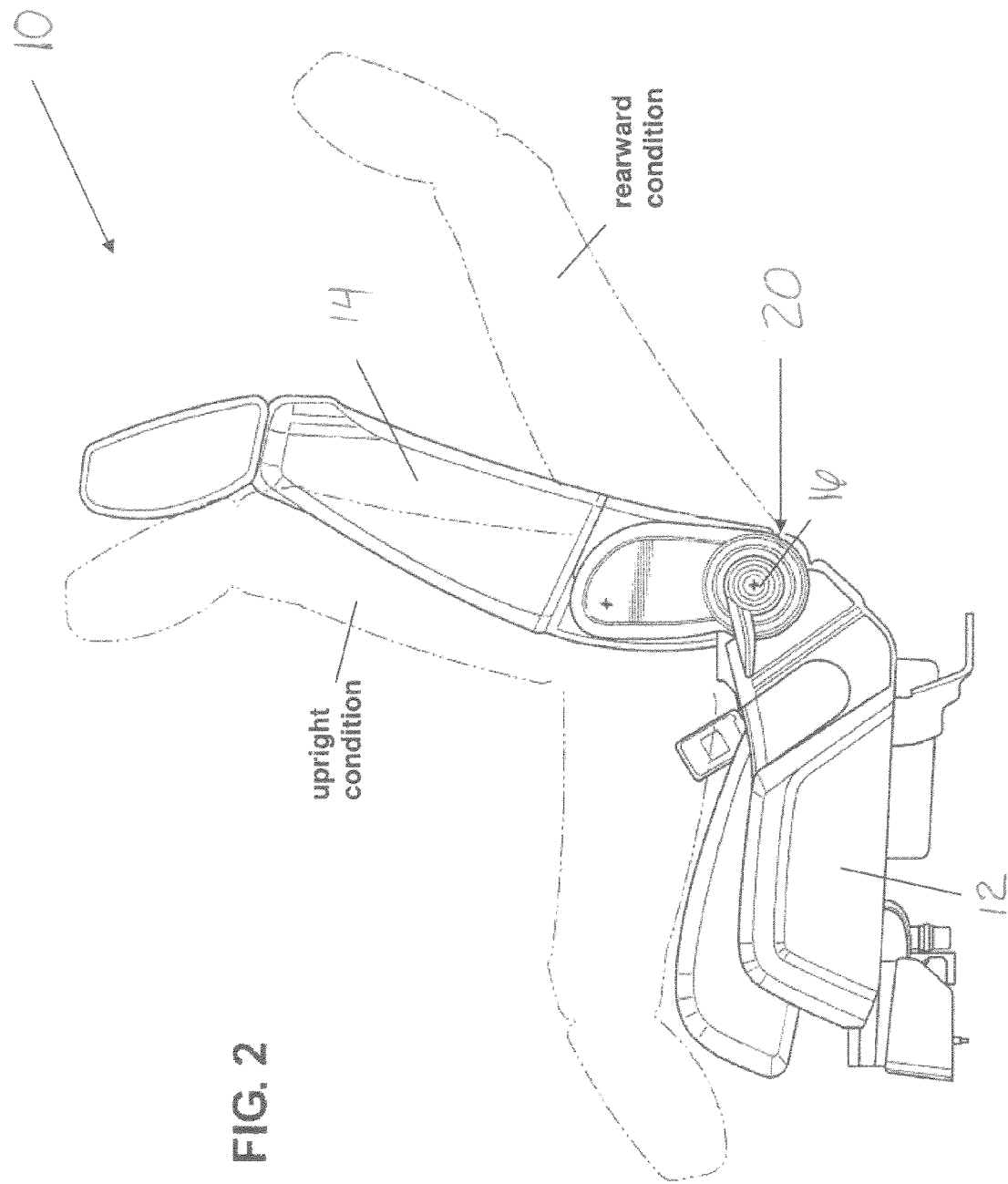
FIG. 2 is a perspective view of a seat assembly according to an exemplary embodiment.

As shown in FIG. 2, the seatback 14 is capable of reclining rearwardly to a maximum rearward condition shown in phantom. The angular orientation of the maximum rearward condition is merely exemplary, and in fact either a greater or lesser degree of angular tilt may be achieved according to the design specification. The seatback 14 can be rotated to a maximum upright condition shown in phantom. The seatback 14 rotates relative to the seatbase 12 about an axis 16.

Movement of the seatback 14 between its maximum upright and maximum rearward reclining conditions is accomplished through a pair of rotary recliner mechanisms 20. One rotary recliner mechanism 20 is located on each side of the seat assembly 10, and is of generally identical or mirror-image construction. The rotary recliner mechanism 20 is configured to establish incremental reclining adjustments about a generally horizontal first axis 16. Thus, the rotary recliner mechanism 20 permits relative pivotal movement between the seatback 14 and the seatbase 12. The rotary recliner mechanism 20 can accomplish incremental reclining adjustments using various tooth engaging constructions. In addition, the top plate includes at least one alignment indicator formed on the outer surface of the top plate for use in connection with providing proper alignment during assembly of the "heart" mechanism.

Figures 3, 4:
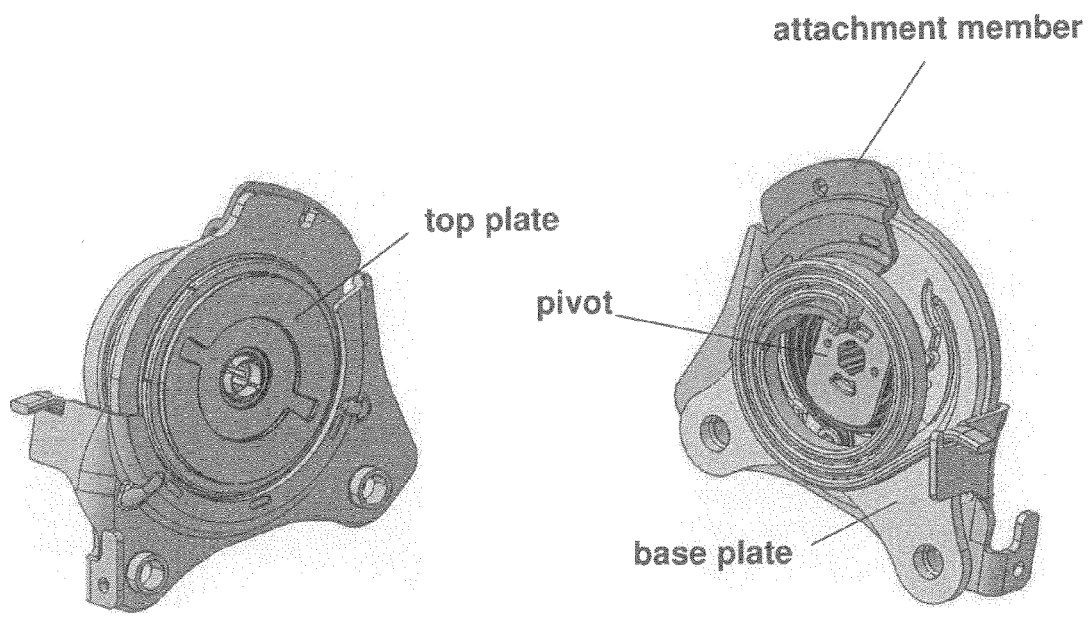
FIG. 3 is a perspective view of a prior art recliner assembly.
FIG. 4 is a perspective view of a prior art recliner assembly.
Figure 5:
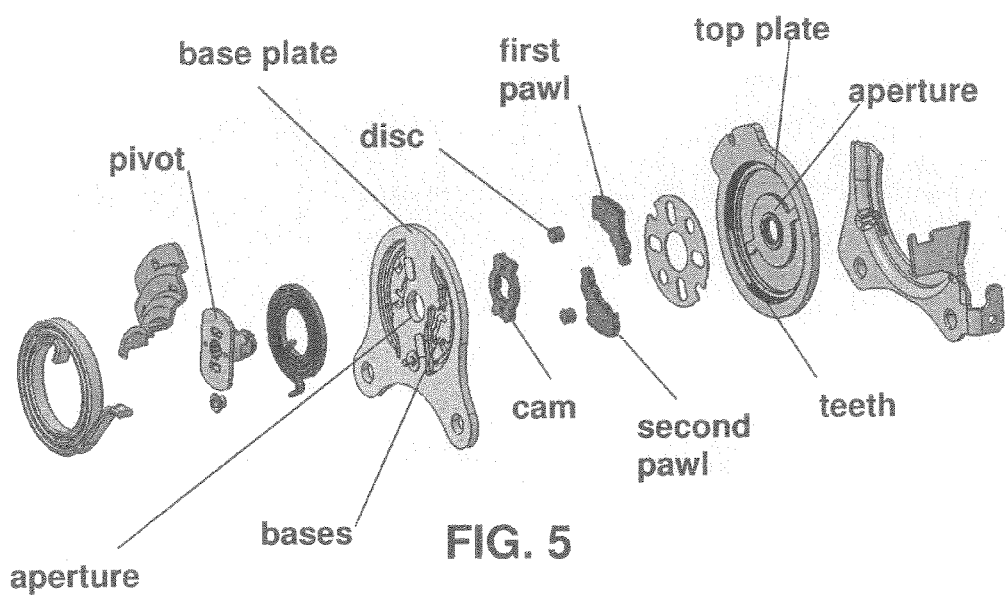
FIG. 5 is an exploded perspective view of a prior art recliner assembly, seatbase bracket and seatbase return spring.

Referring in particular now to FIGS. 3-5, a prior art recliner mechanism for use as an adjuster in a vehicle seat is shown. The prior art recliner mechanism includes a base plate, a top (or sector) plate, a cam, a separate pivot, a first or upper pawl, a second or lower pawl, a first or upper round disc, and a second or lower round disc. The base plate includes contoured bosses or extension members which support a first (or upper) and a second (or lower) pawl members in position. The base plate also includes an aperture at its center through which the separate pivot member extends. In the prior art mechanism shown, the cam member is a separate piece and is carried by the pivot member such that the cam member engages the first and second pawls and the first and second disc members.

Figure 6:
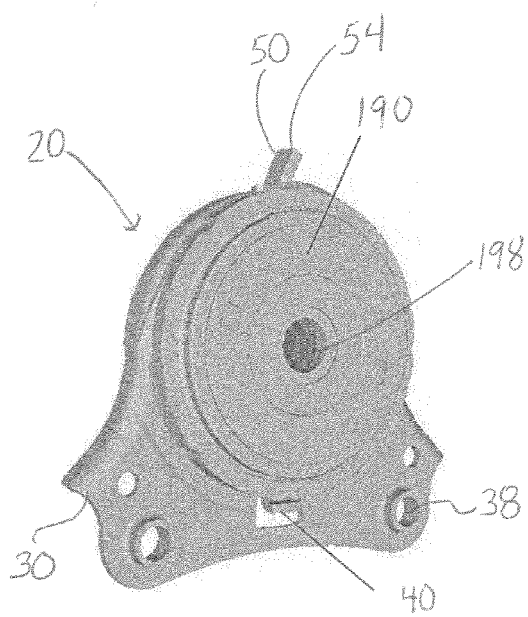
FIG. 6 is a perspective view of the subject improved recliner assembly.
Figure 7:
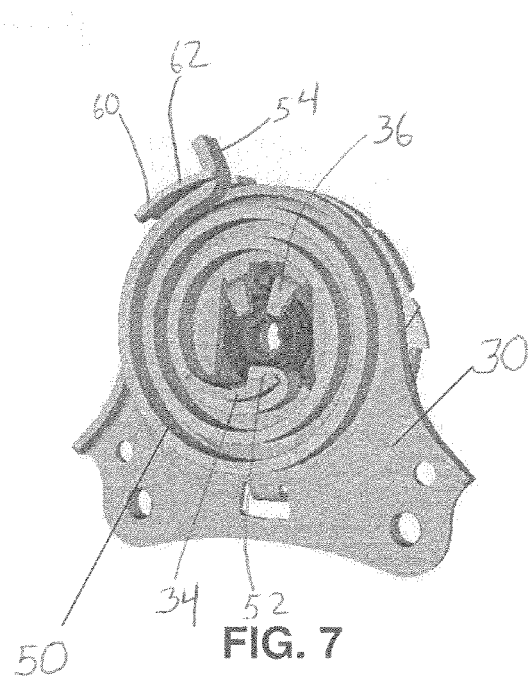
FIG. 7 is a perspective view of the subject improved recliner assembly.
Figure 8:
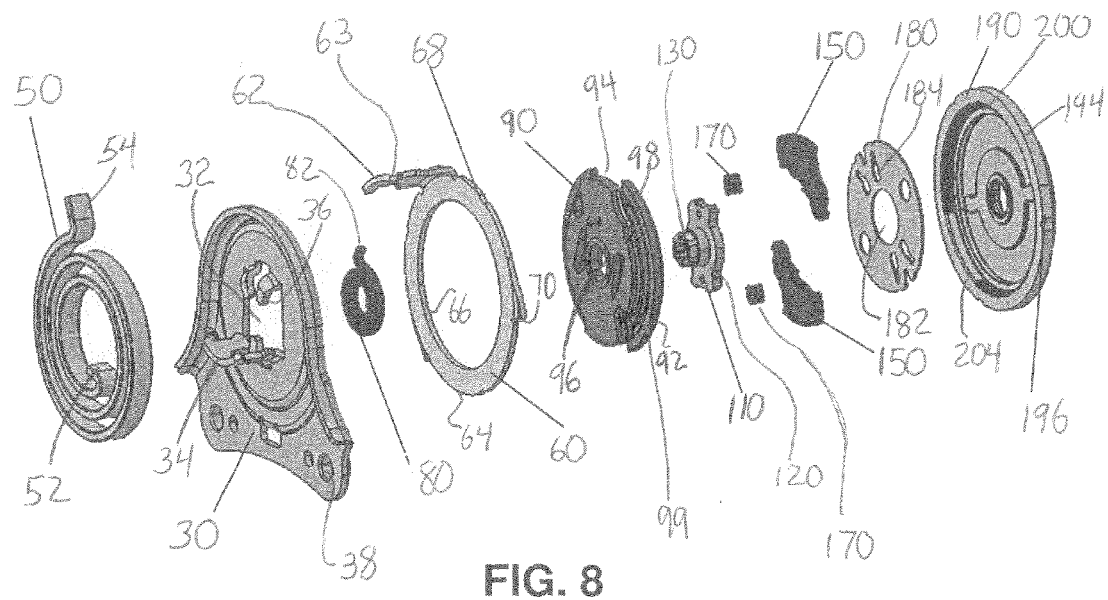
FIG. 8 is an exploded perspective view of the subject improved recliner assembly, seatbase bracket and seatbase return spring.

In the present invention, the recliner mechanism 20 generally includes a seatbase bracket 30, a seat back return spring 50, a retainer plate 60, a cam spring 80, a base plate 90, an integral cam pivot 110, pawls 150, a guide plate 180 and a top plate 190. FIGS. 6-8 show an embodiment of an improved recliner mechanism 20 for use as an adjuster in a vehicle seat assembly 10. The improvements to the recliner mechanism 20 include a retainer plate 60, one-piece cam or integral cam pivot 110 and pawl disc members 170 including flat portions 172 for interaction with a flat portion 165 on both of the first and second pawl members 150. The base plate 90 is affixed to the seatbase 12 and the top plate 190 to the seatback 14. As shown in FIGS. 6 and 7, the base plate 90 of the recliner mechanism is assembled to the seatbase bracket 30, the top plate 190 is assembled to the seatback bracket (not shown) and a seatback return spring 50 is interconnected to both the seatbase bracket 30 and the top plate 190 (through use of a retainer plate 60).

The seatbase bracket 30 may be formed in a variety of sizes, shapes and configurations as desired so long as it is able to attach securely to the seatbase 12 and allow other components of the recliner mechanism 20 to be coupled thereto. The seatbase bracket generally includes a bracket aperture 32, a return spring catch 34, cam spring retainer tabs 36 and attachment features 38. The return spring catch 34 is configured to engage the seatback return spring 50 which has an inner catch 52 engaging the return spring catch 34. The seatback return spring 50 also includes an outer catch 54 engaging the retainer plate 60 as described below. The seatback return spring 50 is configured to bias the seatback 14 forward thereby assisting the seat occupant in moving the seatback 14.

The recliner mechanism 20 further includes a retainer plate 60 generally having a spring attachment leg 62, an outer circumference 64, an inner circumference 66 and an alignment indicator 68. The spring attachment leg 62 is configured to engage the outer catch 54 on the seatback return spring 50 and the retainer plate 60 is coupled either directly or indirectly to the seatback 14 such that it rotates in coordination with the movement of the seatback 14. The outer circumference 64 is generally visible in the Figures and includes at least one alignment indicator 68. The retainer 60 is defined in a circular shape and is sized to provide certain continuous support to the base plate 90 as described below.

The base plate 90 generally includes an outer circumference 92 formed primarily by arcuate members 98. The retainer plate 60 is generally welded to the top plate 190, which together cooperate to entrap the guide plate 180, pawls 150, wedges 70, one-piece cam 110 and base plate 90. The described entrapment helps during the assembly process and ensures that the recliner mechanism performs in a crash condition without lateral expansion. The base plate further includes ledges 99 inset from the arcuate members 98. The arcuate members 98 have a diameter that is greater than the diameter of the inner circumference 66 of the retainer plate. It should also be noted that the outer circumference 92 of the base plate 90 does not form a complete circle but instead includes pawl gaps 94. Of course, in some configurations, the outer circumference 92 could form an outer circle, however in the exemplary embodiments, the pawl gaps 94 provide space for the pawls 150 to slide into engagement with the top plate 190. As such, the contact surface of the outer circumference 92 illustrated as arcuate members 98 is approximately 70% but other amounts may be used, so long as sufficient support remains. The base plate 90 includes a base aperture 96 generally aligned about the rotational axis 16. The base plate 90 also defines pawl guides 100 which include edges 102 defined therebetween. The ledges 99 and arcuate members 98 cooperate with the retainer plate 60 to provide lateral support to the base plate 90.

One of the improvements included in the subject recliner mechanism 20 includes the use of a fully circular retainer plate 60 instead of the attachment feature used in the prior art recliner mechanism. The retainer plate 60 is fully circular and ring-like having an inner ring surface 66 and an outer ring surface 64. Like the attachment feature of the prior art, the retainer plate 60 is attached to the top plate 190; however, since the retainer plate 60 is fully circular, it is designed to interact with an external surface of the top plate 190 about a full 360 degrees to thereby help to counteract the radial forces extending from the pawls 150 when the recliner mechanism 20 is in the locked condition and under high loads. In addition, the ledges 99 of the base plate, defined to receive the inner ring surface 66 of the retainer plate 60, has a diameter which is less than an overall outer diameter of the base plate 90, specifically arcuate member 98. By providing this stepped configuration on the outer circumference 92 of the base plate 90, the location of the retainer plate 60 relative to the base plate 90 is fixed and the lateral movement of the base plate to the top plate is reduced under high load conditions.

The retainer ring or retainer plate 60 prevents outward radial movement of the top plate 190 at the outer edge 201, such that the teeth 200 of the top plate are no longer parallel to the axis, potentially causing lateral expansion of the recliner mechanism along the axis. More specifically, any expansion of the teeth causes the pawls to experience undesirable force along the axis which may lead to lateral expansion. The retainer plate 60 by having an inwardly extending inner circumference 66 counteracts or minimizes any outward radial expansion by providing radial support proximate to the outer edge 201, but also prevents undesirable lateral expansion as the base plate and pawls are constrained against lateral expansion by the retainer plate 60. Welding, staking or otherwise coupling the retainer plate 60 to the top plate also simplifies assembly.

Figure 9:
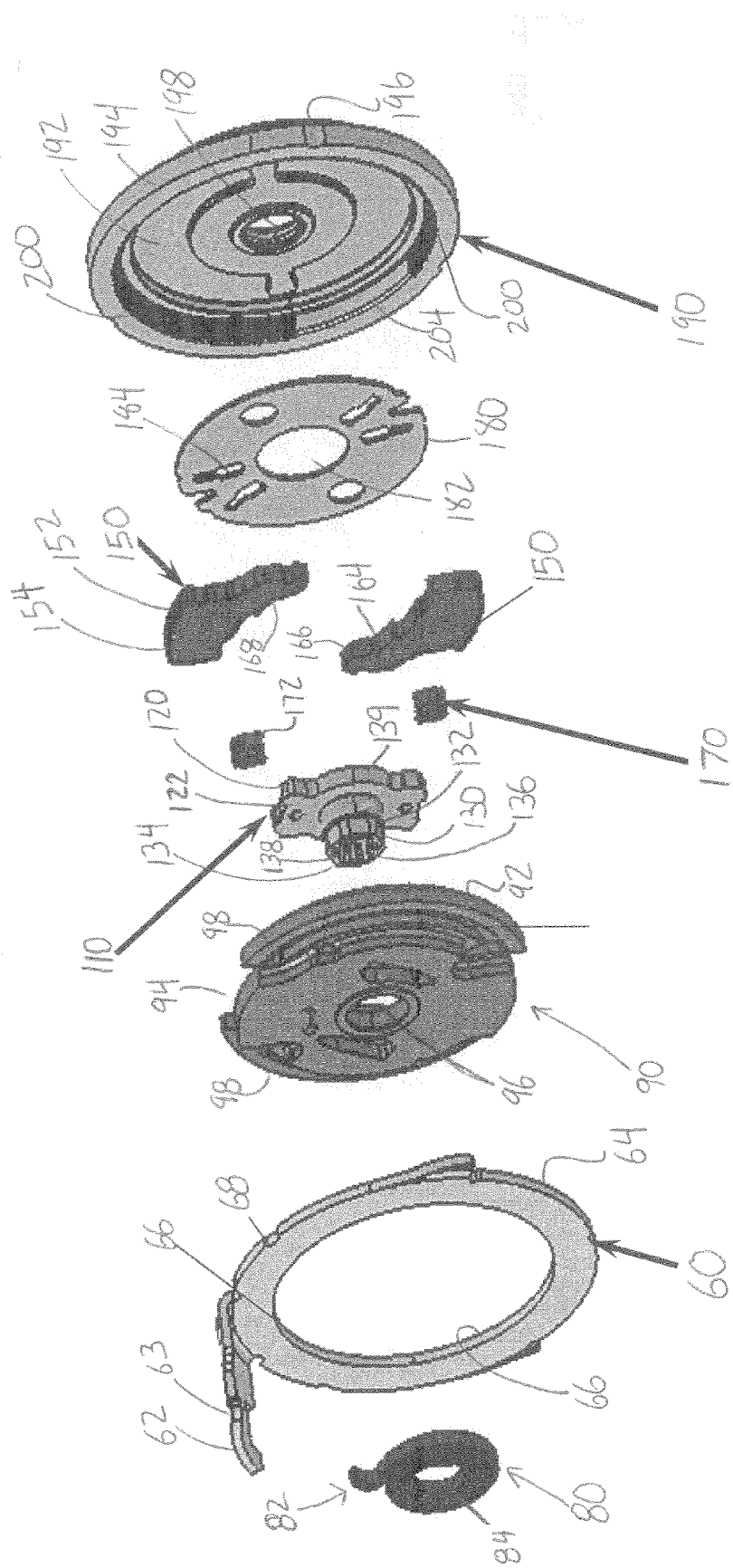
FIG. 9 is an exploded perspective view of the subject improved recliner mechanism.

The retainer plate 60 as described above includes a spring attachment leg 62 extending axially from the outer surface of the retainer plate 60. The spring attachment leg 62 includes a u-shaped channel 63 defined to receive one end 54 of the seatback return spring 50. The retainer plate 60 also includes at least one stop flange 70 extending radially outward from the external surface of the retainer plate 60 for use in connection with at least one detent 40 formed on the seatbase bracket 30. In use, the retainer plate flange 70 is designed to interact with the detent 40 formed on the seatbase bracket 30 to limit the amount of overall rotation between the seatback 14 and seatbase 12 to thereby provide normal travel range. The retainer plate 60 is typically formed of stamped steel but may also me formed in any number of other ways including fine-blanking. The retainer plate 60 further includes at least one alignment indicator 68 formed on the outer ring surface 64 for use in connection with aligning with the top plate 190. In this embodiment, the top plate 190 and the retainer bracket 60 are shown having three alignment indicators 68, 204 positioned at predetermined locations; however, it should be appreciated that any number of alignment indicators may be used. FIG. 9 shows the stepped configuration of the base plate 90 permitting the retainer plate 60 to support the base plate 90 laterally.

The recliner mechanism 20 further includes the unitary cam-pivot member 110. The unitary cam-pivot member 110 is formed out of a single unitary piece of metal and generally includes a cam portion 120 and a extended portion 130. The unitary cam-pivot member 110 is configured as shown in the Figures such that the extended portion 130 is formed out of the center material of the cam portion 120. The cam portion 120 generally includes an outer cam surface 122 which engages the pawls 150 as described below. The extended portion 130 generally includes an outer surface 132 having a cam spring mounting area 134 and a flat portion or catch 136 in the cam spring mounting area 134 which engages a cam spring 80. The cam spring 80 also includes an outer cam catch 82 which engages the base plate 90 and an inner cam catch 84 which engages the catch or flat portion 136. The extended portion 130 also includes an internal spline 138 or other shaped configuration matching the outer configuration of a driveshaft (not shown) which extends between the first and second recliner mechanisms through the seatback 14 or seatbase 12. It is important that the cam portion 120 and extended portion 130 to be formed out of a single unitary piece. The actual shape, size, or configuration may vary from that illustrated depending on the desired application. The recliner mechanism is configured such that the driveshaft extends through the base aperture 96, bracket aperture 32 as well as the apertures mentioned below such that it may extend between each of the recliner mechanisms 20 as well as to a handle or lever (not shown) which is used by the occupant of the seat to actuate and rotate the driveshaft. As the driveshaft rotates, its engagement with the extended portion 130 of the unitary cam pivot member 110 causes the cam 120 to rotate such that the outer cam surface 122 engages or disengages the pawls 150 from the teeth on the top plate 190. The outer surface 132 also includes a base plate extension area 139 wherein the extended portion 130 is configured to pass through and to rotate within the base aperture 96 such that the cam member 110 specifically the cam portion 120 is properly aligned within the pawl guides 100 and maintains the proper configuration of the pawls 150 on one side of the base plate 90 and the cam spring on the other side of the base plate.

FIG. 8 shows another improvement of the subject improved recliner mechanism. The base plate 90 includes an aperture 96 at its center through which a one-piece cam pivot member 110 extends having the cam spring mounting area 134 formed integral therewith. In the prior art recliner, the pivot is a separate component from the cam. The prior art pivot includes an internal drive spline formed with use of a broaching process performed after assembly into the mechanism. With the improved one-piece cam 110, the need to separately form the cam spring mounting area 134, including an internal spline 138, with the broaching process after assembly is eliminated thereby reducing the cost of the improved recliner mechanism. With the improved one-piece cam member 110, the internal spline 138 can be formed in the extended portion prior to assembly of the "heart" mechanism thereby reducing cost and complexity. In this embodiment, the one-piece cam member 110 is provided with a cam portion 120 and a extended portion 130, including an internal spline 138, both formed integrally in one piece. The cam portion 120 is defined for interaction with the pawl members 150 and discs 170 and the extended portion 130 extends through the base plate 90 and interacts with the cam spring 80 and the recliner drive shaft (not shown). In addition, since the cam and the extended portion are formed integral, the cam spring 80 can be mounted directly to the extended portion 130 without the need for an additional plastic bushing used in connection with the prior art two-piece cam and pivot. The internal spline 138 formed on the extended portion 130 is provided for interaction with a drive shaft extending from one side of the seat assembly to the other.

Figure 11:
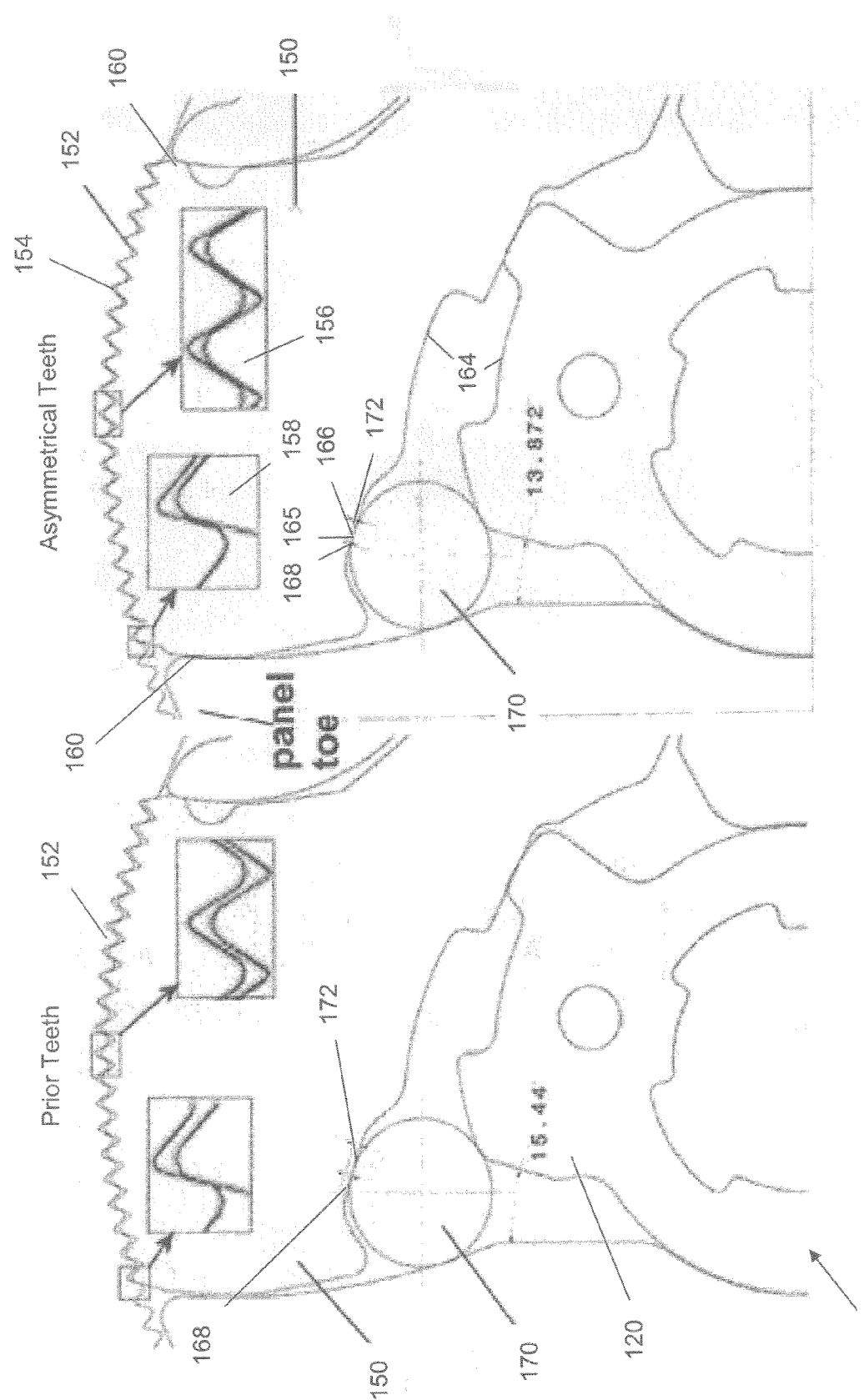
FIG. 11 is a partial side view of the base plate and pawl members of the subject improved recliner mechanism.

The pawls 150 are configured to have an outer surface 152 with asymmetrical teeth 154. As illustrated in the Figures, the center teeth on the pawl may have a first shape 156 while the teeth on the outer limits may have a second shape 158. Of course, the shape of the teeth between the first shape 156 and second shape 158 may change gradually as the distance increases from the center of the teeth on the pawls 150. Referring in particular to FIG. 11, as discussed in more detail herein, the pawl members 150 include teeth 154 for engagement with the internal teeth 200 of the top plate 190 to thereby lock the recliner mechanism 20. Similar to known recliner mechanism 20, the pawl members 150 include teeth 154 extending along one external surface 152 for selective engagement with the internal teeth 200 of the top plate 190. The teeth 154 extend continuously on the outer surface 152 between each side 160. In this FIG. 11, the first few teeth proximate to the sides 160 are shown to ramp or tilt toward the center of the row of teeth to thereby provide a progressive ramp of the teeth at each end of the row of pawl teeth. By providing this progressive configuration or ramp, the pawl teeth 154 engage with the internal teeth 200 of the top plate 190 more effectively in extreme tolerance conditions thereby reducing slippage therebetween.

The pawls 150, in addition to the outer surface 152, generally include side surfaces 160 extending to an inner surface 164. The inner surface 164 generally includes a cam surface 166. The surface 166 is configured to receive and apply force from the cam portion 120 of the unitary cam-pivot member 110 through the discs 170 when the teeth 154 are to be engaged against the top plate 190.

Discs 170 may be associated with each of the pawls 150 and include a flat portion 172 engaging a flat portion 165 on the pawls 150. By improving the resistance to the looseness of the seatback by preventing the discs from rotating, which may unintentionally open the cam, the flat portions 172, 165 improve the engagement and disengagement of the pawls 150.

Figure 10:
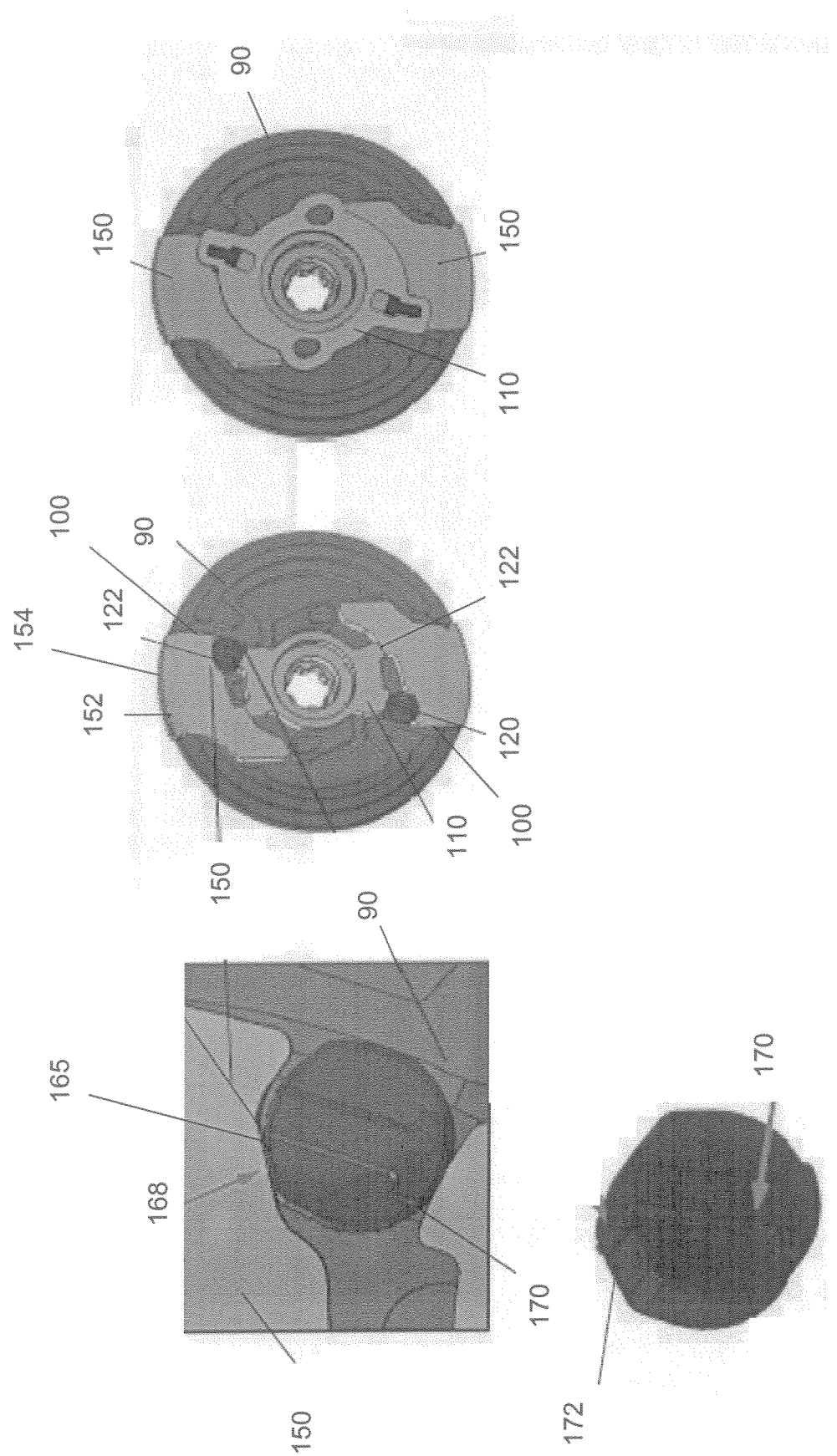
FIG. 10 is a perspective view of the base plate, pawl and disc members of the subject improved recliner mechanism.

FIG. 10 shows another improvement of the subject recliner mechanism 20. Referring in particular to FIG. 10, the recliner mechanism 20 is shown with the top plate 190 removed. The base plate 90 includes contoured bosses or pawl guides 100 which support first and second pawl members 150 having teeth 154. The base plate 90 further supports first and second pawl discs 170 defined for interaction between the one-piece cam 110, specifically the cam portion 120 and the first and second pawl members 150, respectively. Each of the pawl discs 170 is shown having at least one flat portion 172 on the circumference of the disc, in addition, each of the pawl members 150 includes a mating flat portion 168 formed on a throat of each pawl member 150. Typically, as shown in the prior art recliner, a pawl disc is completely circular with no flat interface and no corresponding flat portion formed on the pawl member. As such, without the flat interface, the pawl disc can rotate when the pawl translates in the pawl pocket. This rotation of the pawl disc causes the cam to then rotate and the pawl member can slip causing the teeth of the pawl member to be disengaged, or less engaged, with the internal teeth of the top plate. Instead, with the improvement of the subject recliner mechanism 20, the flat portion 172 of the disc 170 and the flat portions 168 of the pawl member 150 prevent rotation of the disc thereby reducing disengagement (or slip) of the recliner mechanism 20.

The recliner mechanism 20 also includes a guide plate 180 having a center aperture 182 and guide apertures 184. The guide plate 180 interacts between the cam portion 120 and the pawls 150 to primary guide the discs when the cam has been disengaged from the cam receiving surface 122 and the pawls 150.

The recliner mechanism further includes a top plate 190 having a recess 192 in which internal teeth 200 extend around the inner circumference. The top plate 190 further includes an outer circumference 194 on which at least one alignment indicator 196 is provided to allow for easy alignment during the assembly process. The top plate further includes an aperture 198 through which the driveshaft may extend. Attachment mechanisms 204 may also be provided on the top plate 190 to couple the complete recliner system together.

FIG. 8 also shows another improvement of the subject recliner mechanism 20. In the prior art recliner mechanism, the attachment feature is welded to the top plate. Since the material selection of the top plate requires a certain hardness value in order to obtain a given strength for the interaction of the internal teeth and the pawl teeth, an additional costly manufacturing step is required for the prior art recliner mechanism. Such additional step is referred to in the industry as masking. It will be appreciated that this masking process is required in order to weld the attachment feature to the top plate without loss of the hardness required for the top plate. However, for the subject improved recliner, since the retainer plate 60 provides some additional strength to the recliner mechanism, the top plate 190 can be made with a lower hardness value thereby not requiring this costly masking process. It has been found that by adding boron to the top plate material, it markedly increases hardenability when it is added to a fully deoxidized steel. The preferred material for the top plate is the 10B21 material with no masking required.

Figure 12:
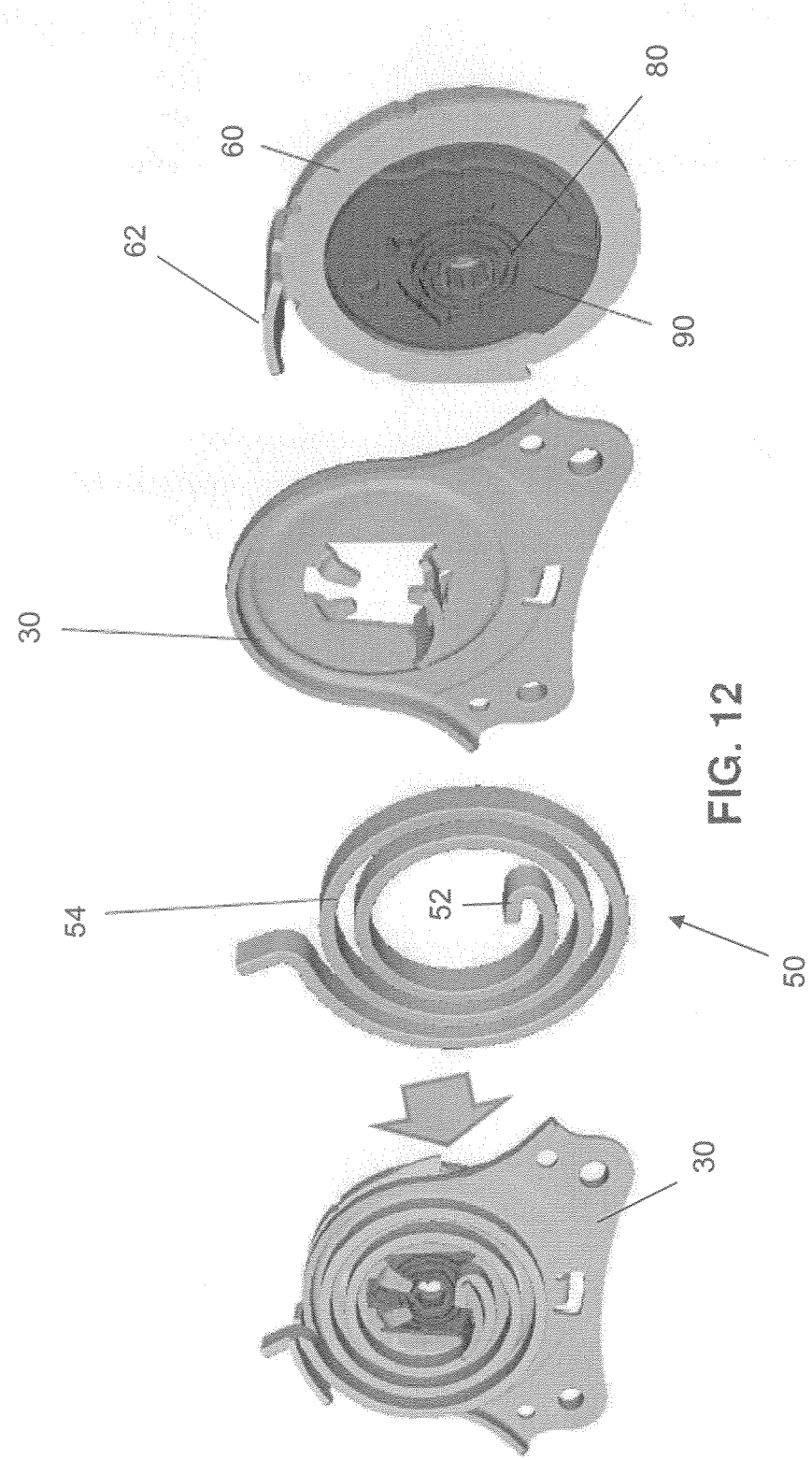
FIG. 12 is an exploded perspective view of the recliner mechanism for assembly to a seatbase bracket and seatback return spring.
Figure 13:
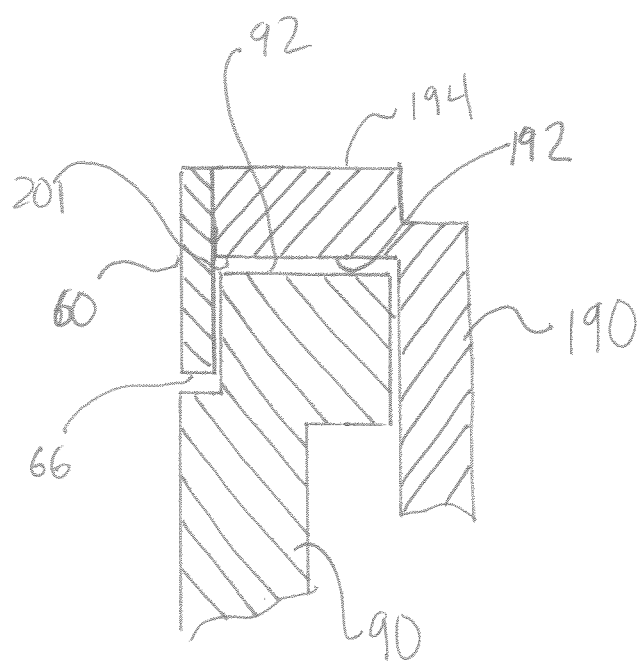
FIG. 13 is a partial sectional view of the recliner mechanism.

Referring to FIG. 12, the recliner mechanism 20 is shown for assembly to the seatbase bracket 30 and the seatbase return spring 50. The base plate 90 is laser welded to the seatbase bracket 30 and the top plate 190 to the seatback bracket (not shown). More specifically, the base plate 90 can be selectively aligned with the seatbase bracket 30 in order to ensure complete alignment with the other recliner mechanism (not shown) disposed for use on the other side of the seat assembly. After aligning the base plate 90 of the recliner mechanism 20 to the seatbase bracket 30 the base plate 90 is laser welded to the seatbase bracket 30. Further, as part of this alignment step, the seat return spring 50 is attached to the seatbase bracket 30 and the retainer plate 60 prior to the final laser welding of the base plate 90 to the seatbase bracket 30. One end 52 of the seat return spring 50 is attached to the seatbase bracket and the other end 54 is attached to the retainer plate 60. Since the retainer plate 60 and the seatbase bracket 30 can be easily modified, they may provide different features for each vehicle application without having to modify the recliner mechanism. For example, the stop features of the retainer plate 60 can be modified to provide a different recliner ultimate stop position and the seatback spring load can be easily changed for each vehicle by simply changing the configuration of the u-shaped channel 63 on the retainer plate 60 without having to change other recliner mechanism components.

The method of assembling the recliner mechanism includes assembling the pawl members 150 and disc members 170 into the base plate 90 adjacent the one-piece cam 110 which, with the pivot integral thereto, is inserted specifically the extended portion 130 into the base plate 90. Then the top plate 190 is assembled onto the base plate 90 so that the centerline of the top plate 190 is aligned with axis 16. Aligning the aperture of the top plate and base plate along axis 16 using the alignment indicators positioned on the retainer plate 60 and the top plate 190. Laser welding the retainer plate 60 to the top plate 190 to thereby form the final recliner mechanism. Aligning the extended portion 130, having the internal spline 138, to the seatbase bracket and laser welding the recliner assembly to the seatbase bracket 30 is also accomplished. Assembling the recliner mechanism having the seatbase bracket mounted thereto to either (or both) sides of the seat assembly, and mounting a drive shaft between each side of the seat assembly is completed.

These illustrations, together with the accompanying annotations are highly informative and will be readily appreciated by those skilled in the art. Furthermore, the various depictions throughout all of the figures in this application may be mixed and matched with one another, thus multiplying the use of three-dimensionally knit materials within a seat trim cover.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A recliner mechanism for a vehicle seat assembly comprising:
   a retainer plate having a spring attachment leg, and a substantially circular inner circumference;
   a base plate having an outer circumference that is approximately circular in shape and includes an alignment ledge on said outer circumference capable of aligning and positioning said retainer plate relative to said base plate, and a substantially circular base plate aperture; and
   a pawl constrained for substantially radial movement relative to an axis of rotation of the base plate and wherein said pawl includes slide side surfaces and an inner surface having a flat portion configured to engage a flat portion on a disc located between said pawl and a unitary cam member, and wherein said unitary cam member is integrally formed as a single piece and including a cam portion configured to engage at least one of said pawl and said disc, and an extended portion and wherein said extended portion includes a substantially circular base plate extension area configured to fit within and pass through said base plate aperture.

2. The recliner mechanism of claim 1 further including a top plate formed from 10B21 material with no masking required.

3. The recliner mechanism of claim 1 wherein said retainer plate includes at least one alignment indicator.

4. The recliner mechanism of claim 1 wherein said base plate has at least two arcuate members defining pawl gaps therebetween and wherein each of said arcuate members has a radius from a rotational axis that is greater than the radius of the inner circumference of said retainer plate, and said base plate further includes at least one ledge having a radius that is less than the radius of the inner circumference.

5. The recliner mechanism of claim 4 further including pawls and a unitary cam member and wherein said base plate includes pawl guides and a pawl is arranged between each pair of pawl guides and wherein said unitary cam pivot member includes a cam portion having an outer cam surface configured to engage said pawls each through a disc and an extended portion configured to be assembled within an aperture on said base plate and wherein said retainer plate is welded to a top plate thereby cooperatively capturing said base plate extended and said pawls, said discs, and a guide plate.

6. The recliner mechanism of claim 4 wherein said arcuate members form at least 60% of the outer circumference of said base plate.

7. The recliner mechanism of claim 5 wherein said pawls include teeth and said teeth are asymmetrical.

8. The recliner mechanism of claim 7 wherein a tooth substantially aligned with a longitudinal axis of the pawl has a first shape and wherein each tooth in closest proximity to each side of the pawl has a second shape and wherein said first and said second shapes are different.

9. The recliner mechanism of claim 1 further including a seat recline spring and wherein said seat recline spring is coupled to said spring attachment leg on said retainer plate.

10. A recliner mechanism for a vehicle seat assembly comprising:
    a retainer plate having a spring attachment leg, and a substantially circular inner circumference;
    a base plate having an outer circumference that is approximately circular in shape and includes an alignment ledge on said outer circumference capable of aligning and positioning said retainer plate relative to said base plate, and a substantially circular base plate aperture; and
    a unitary cam member integrally formed as a single piece and wherein said cam member includes a cam portion integrally formed with an extended portion and wherein said extended portion extends along an axis and has an outer pivot surface including a cam spring mounting area that is not substantially circular and a base plate extension area that is substantially circular and wherein said extended portion includes an inner surface configured to engage a drive shaft and prevent rotation relative to the driveshaft and wherein said cam portion extends outwardly from said extended portion and includes an outer cam surface;
    wherein said cam outer surface includes two opposing lobes, each having a first projection and a second projection and wherein said cam portion is configured to engage at least one of a pawl and a disc, and an extended portion and wherein said substantially circular base plate extension area is configured to fit within and pass through said base plate aperture.

11. The recliner mechanism of claim 10 wherein said extended portion includes a cam spring mounting area having an integrally formed cam spring catch.

12. A recliner mechanism for a vehicle seat assembly including an axis of rotation, the recliner mechanism comprising:
    a retainer plate having a substantially circular inner circumference having a first radius from the axis of rotation;
    a base plate having arcuate members including an alignment ledge capable of aligning and positioning said retainer plate relative to said base plate, wherein said alignment ledge extends through the substantially circular inner circumference of said retainer plate and wherein said arcuate members define pawl gaps therebetween and wherein said arcuate members have a second radius from the axis of rotation and said alignment ledge has a third radius from the axis of rotation and wherein said base plate has an outer circumference that is approximately circular in shape; and
    a unitary cam-pivot member aligned about said axis of rotation and extending through said base plate and said retainer plate along the axis of rotation and wherein said unitary cam member is integrally formed from a single piece of metal and wherein said unitary cam member includes a cam portion and an extended portion, said extended portion including a cam spring mounting area and a base plate extension area, and wherein includes a non-circular inner surface which extends through both said cam portion and said extended portion said unitary cam-pivot member is capable of rotating relative to said base plate.

13. The recliner mechanism of claim 12 wherein said non-circular inner surface includes at least one spline.

14. The recliner mechanism of claim 12 wherein said first radius is less than said third radius and said second radius is greater than said first radius.

15. The recliner mechanism of claim 12 further including a pawl having teeth, and wherein said teeth are asymmetrical.

16. A recliner mechanism comprising:
a cam member integrally formed as a single piece and including a cam portion and an extended portion and wherein said cam member extends outwardly away from said extended portion and said extended portion includes a cam spring mounting area that is not substantially circular;
a top plate;
a base plate having an outer circumference that is approximately circular in shape;
a cam spring engaged between said cam spring mounting area on said cam member and said base plate;
at least one pawl having a substantially flat surface arranged on said base plate and moveable between engagement and non-engagement with said top plate; and
a disc engaging only a single pawl and having at least one substantially flat surface engaging said flat surface on said pawl and wherein said disc is arranged between and in contact with said cam portion of said cam member and said pawl.

17. A recliner mechanism comprising:
a top plate having an outer circumference and an inner circumference having teeth and wherein said teeth are approximately arranged at a first radius;
a retainer plate coupled to said top plate and wherein said retainer plate includes an inner circumference having a second radius and wherein said second radius is less than said first radius and a spring attachment leg on said retainer plate extending axially; and
a base plate substantially located between said retainer plate and said top plate and wherein said base plate includes an outer circumference having a base plate radius and wherein said base plate radius is greater than said second radius and smaller than said first radius, and wherein said base plate includes at least one ledge configured to engage said inner circumference of said retainer plate.

18. The recliner mechanism of claim 17 wherein said base plate includes pawls arranged between said retainer plate and said top plate and wherein said base plate includes arcuate members having a third radius and wherein said third radius is greater than said second radius.

* * * * *